UNITED STATES PATENT OFFICE.

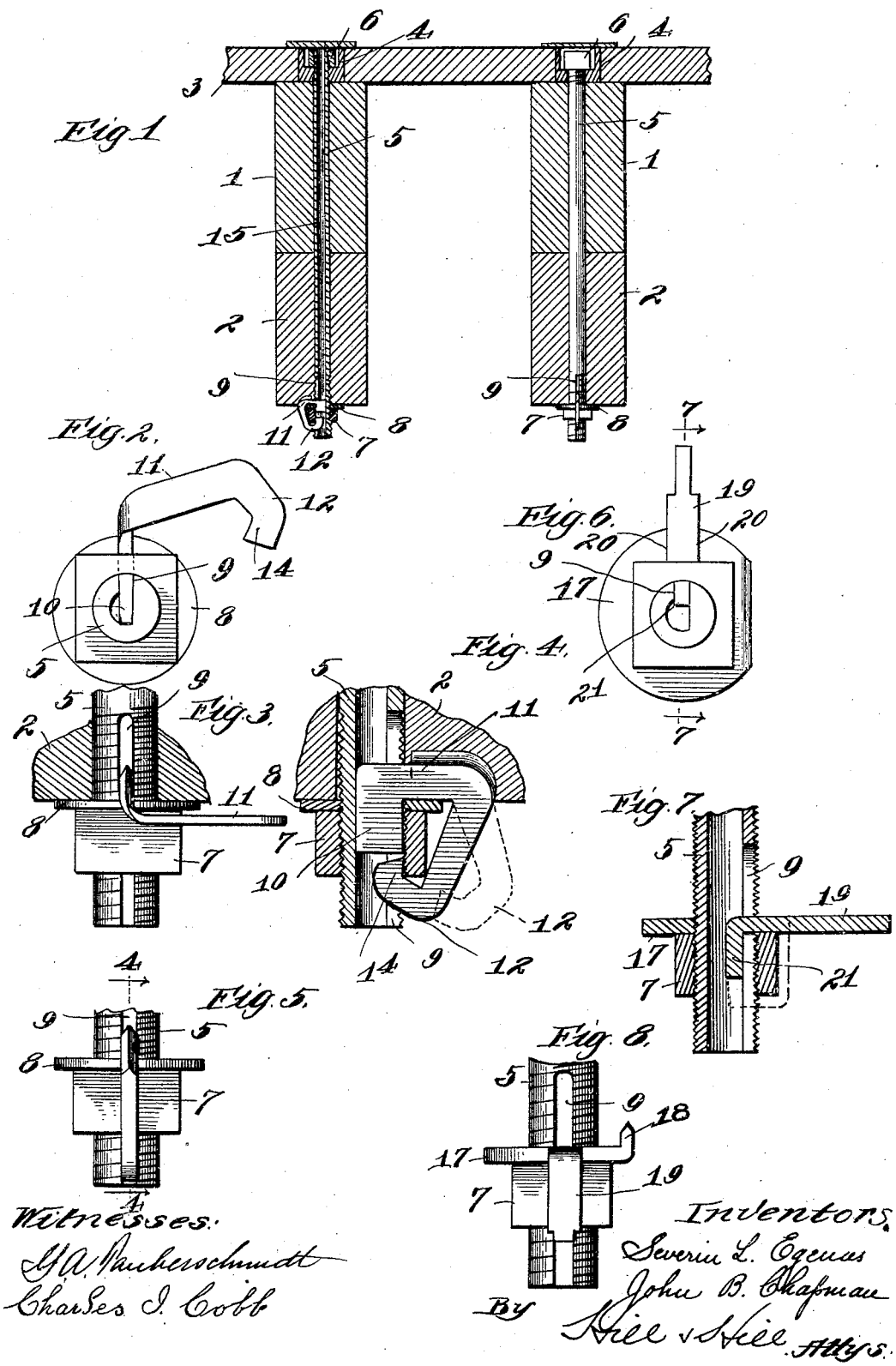

SEVERIN L. EGENAS AND JOHN B. CHAPMAN, OF CHICAGO, ILLINOIS.

BOLT AND NUT LOCK.

No. 931,187.　　　Specification of Letters Patent.　　　Patented Aug. 17, 1909.

Application filed August 29, 1908. Serial No. 450,795.

*To all whom it may concern:*

Be it known that we, SEVERIN L. EGENAS, a subject of the King of Norway, and JOHN B. CHAPMAN, a citizen of the United States, both residing at Chicago, county of Cook, and State of Illinois, have jointly invented certain new and useful Improvements in Bolt and Nut Locks, of which the following is a description.

Our invention relates to means for securing a nut upon a bolt so as to positively prevent any accidental rotation between the bolt and nut.

The object of our invention is to provide a simple, and efficient device of the kind described, particularly adapted to use upon a bolt having a nut upon each end and adapted to prevent the rotation of the bolt itself, or a nut upon the bolt.

The construction of our device is especially applicable for securing the draft timbers in position upon a railroad freight car and our device is especially useful where these securing bolts become broken and require renewal while the car is loaded.

To this end our invention consists in the novel construction, arrangement and combination of parts herein shown and described and more particularly pointed out in the claims.

In the accompanying drawings wherein the like or similar reference characters indicate like or corresponding parts, Figure 1 is a vertical transverse section through the draft timbers and floor of the car showing one of our bolts in section and another in elevation. Fig. 2 is an enlarged plan view from below showing the nut and lock in position, but before the lock is adjusted to prevent rotation of the nut. Fig. 3 is an enlarged elevation of the end of a bolt showing the parts in the position shown in Fig. 2. Fig. 4 is a section taken substantially on line 4—4 of Fig. 5, showing the lock as finally adjusted, and also in broken lines, its form just prior to its final adjustment. Fig. 5 is an elevation similar to that shown in Fig. 3, but with our improved lock in its finally adjusted position. Fig. 6 is a view similar to that shown in Fig. 2, showing a slightly modified form of lock in which the function of a washer is added. Fig. 7 is a section taken substantially on line 7—7 of Fig. 6. Fig. 8 is an elevation of the form of our device shown in Figs. 6 and 7 in its finally adjusted position.

In a preferred form shown in the drawings 1—1 are the center sills of the underframe of a freight car and 2—2 are the draft timbers attached thereto. 3 is the floor of the car provided with the usual pocket washers 4—4, for receiving the head, or where a bolt provided with a nut at each end is employed, for receiving the nut operating at the head of the bolt. The several parts all operate together substantially as usually constructed in devices of this character. In our improved construction the bolts 5—5 are each provided with a nut 6 adapted to fit in the socket of the washer 4 with the bolt extending through the timbers 1 and 2 and its opposite end projecting sufficiently to receive a nut 7 with a washer 8 between the nut and the lower face of the timber 2. A slot 9 is provided in the lower end of the bolt 5 extending longitudinally thereof and of suitable depth to receive the part 10 of our improved lock, and of suitable length to permit the necessary movement of our improved lock when forced into position with its part 11 embedded in the timber 2 and the washer 8 into sufficiently forcible engagement with the timbers to properly secure the same in position. In the preferred construction the part 11 is positioned at substantially right angles to the part 10 with its outer edge sharpened so as to readily enter the timber or, where employed in connection with metal beams, to enter a suitable slot formed in the face of the beam to receive the same.

While the parts are being adjusted, the remaining portions of our device extending from the free end of the part 11 are bent laterally to substantially right angles to the part 10 as shown in Fig. 3, and after the parts are finally adjusted this portion of our lock is bent into the plane of the parts 10 and 11, after which the curved extremity 12 is forced downward into the slot 9 with a portion of the lock preferably in contact with the outer face of the nut as shown in Fig. 4, after which the extreme tip 14 of our device is forced toward the part 10 and into the interior of the nut, thus positively locking the nut against rotation. It is evident that the engagement of the part 11 with the object secured by the bolt will effectually prevent rotation of the bolt, so that, where the nut at the opposite end of the bolt is positioned in a socket as herein described, there is no possibility of the bolt becoming accidentally loosened while in service.

In the form shown in Figs. 6, 7 and 8, a washer 17 is formed integral with our locking device. When thus constructed, a portion 18 of one side of the washer is bent at substantially right angles to the body of the washer to operate in substantially the same manner as the part 11, previously described. A tongue 19 is formed upon the exterior of the washer with slits 20—20 extending from the sides of the tongue 19 toward the central opening of the washer so that when the parts are finally adjusted and a flat side of the nut is positioned at substantially right angles to the tongue, the tongue may be bent against the flat side of the nut and its extremity bent downward at the opposite face of the nut in substantially the same manner as the parts 12 and 14 in the form previously described. In this form also, a part 21 is provided extending radially into the central opening of the washer to engage the slot 9 in the bolt to control the position of the bolt. The operation of this form is evidently substantially the same as that previously described and no further explanation is believed to be required.

Having thus described our improvement, it is obvious that various immaterial modifications may be made in our device without departing from the spirit of our invention, hence we do not wish to be understood as limiting ourselves to the exact form or construction shown.

What we claim as new and desire to secure by Letters Patent is:

1. In a nut lock, the combination with a bolt having a longitudinal opening formed therein, of a nut threaded upon said bolt, and a locking member which passes through the side wall of the bolt upon the inner side of the nut and extends downwardly inside of said bolt into engagement with said nut, the opposite end of said locking member being bent downwardly over the side of the nut and around the lower edge of said nut, substantially as shown and described.

2. In a nut lock, the combination with a bolt having a longitudinal opening formed therein, of a nut threaded upon said bolt, and a locking member which passes through the side wall of the bolt upon the inner side of the nut and extends downwardly inside of said bolt into engagement with said nut, the opposite end of said locking member being bent downwardly over the side of the nut and around the lower edge of said nut, the intermediate portion of the locking member entering the structure held in position by the nut and bolt to thereby hold the bolt against turning with relation to said structure, substantially as shown and described.

In testimony whereof, we have hereunto signed our names in the presence of two subscribing witnesses.

SEVERIN L. EGENAS.
JOHN B. CHAPMAN.

Witnesses:
  Roy W. Hill,
  Charles I. Cobb.